June 17, 1958 W. G. MUELLER 2,839,106
APPARATUS FOR ROTATING AND TRANSPORTING LOGS DURING
BROADSIDE ATTACK BY BARK-REMOVING CHAINS
Filed May 14, 1956 9 Sheets-Sheet 1

FIG. 1

INVENTOR.
Willard G. Mueller
BY
David A. Fox
attorney

June 17, 1958 W. G. MUELLER 2,839,106
APPARATUS FOR ROTATING AND TRANSPORTING LOGS DURING
BROADSIDE ATTACK BY BARK-REMOVING CHAINS
Filed May 14, 1956 9 Sheets-Sheet 2

FIG. 2

INVENTOR.
Willard G. Mueller
BY David A. Fox
Attorney

June 17, 1958 W. G. MUELLER 2,839,106
APPARATUS FOR ROTATING AND TRANSPORTING LOGS DURING
BROADSIDE ATTACK BY BARK-REMOVING CHAINS
Filed May 14, 1956 9 Sheets-Sheet 4

INVENTOR.
Willard G. Mueller
BY
David A. Fry
attorney

June 17, 1958 W. G. MUELLER 2,839,106
APPARATUS FOR ROTATING AND TRANSPORTING LOGS DURING
BROADSIDE ATTACK BY BARK-REMOVING CHAINS
Filed May 14, 1956 9 Sheets-Sheet 6

INVENTOR
Willard G. Mueller
BY David A. Fox
attorney

United States Patent Office 2,839,106
Patented June 17, 1958

2,839,106

APPARATUS FOR ROTATING AND TRANSPORTING LOGS DURING BROADSIDE ATTACK BY BARK-REMOVING CHAINS

Willard G. Mueller, Winter, Wis., assignor to Northern Wood Barking Mfg. Co., Chippewa Falls, Wis., a corporation of Wisconsin Application May 14, 1956, Serial No. 584,617

6 Claims. (Cl. 144—208)

The invention relates to barking apparatus for removing the bark from logs, especially pulpwood logs and more particularly poplar logs.

Poplar logs have been mentioned especially above because barking apparatuses available have not been able to satisfactorily take off the bark from poplar logs except only when their bark is in a somewhat loosened condition that only occurs in a brief period in the late spring. It has been found that the bark can be removed from poplar by whipping the bark off with revolving chains, but prior to this invention no satisfactory machine has been available for utilizing this method of removing bark from logs so as to keep the cost of the operation within limits that will compete in price with the removal of bark by other methods from other sources of pulpwood.

Heretofore in flinging-chain apparatus only one log is operated upon at a time, and this limits the number of logs that can be handled in a given period. One of the objects of this invention is to provide a barking apparatus in which the bark is removed from the logs as they are carried along on a moving conveyor so that a plurality of logs can be operated on and thus increase the production rate as compared to prior machines.

Another and important object of the invention is to provide means for centering each log automatically on a carrier unit of the conveyor by which the log is revolved as it is carried by the conveyor past a plurality of revolving beater elements that break the bark off from the logs.

The invention further consists in the several features hereinafter set forth and more particularly defined by the appended claims.

In general the apparatus includes a supply conveyor 20, a main conveyor 21, means for positioning and attaching logs to said conveyor 21, means acting on the logs as they are carried along by the conveyor 21 to remove the bark therefrom, and means for removing the debarked logs from the conveyor 21.

Figure 1:
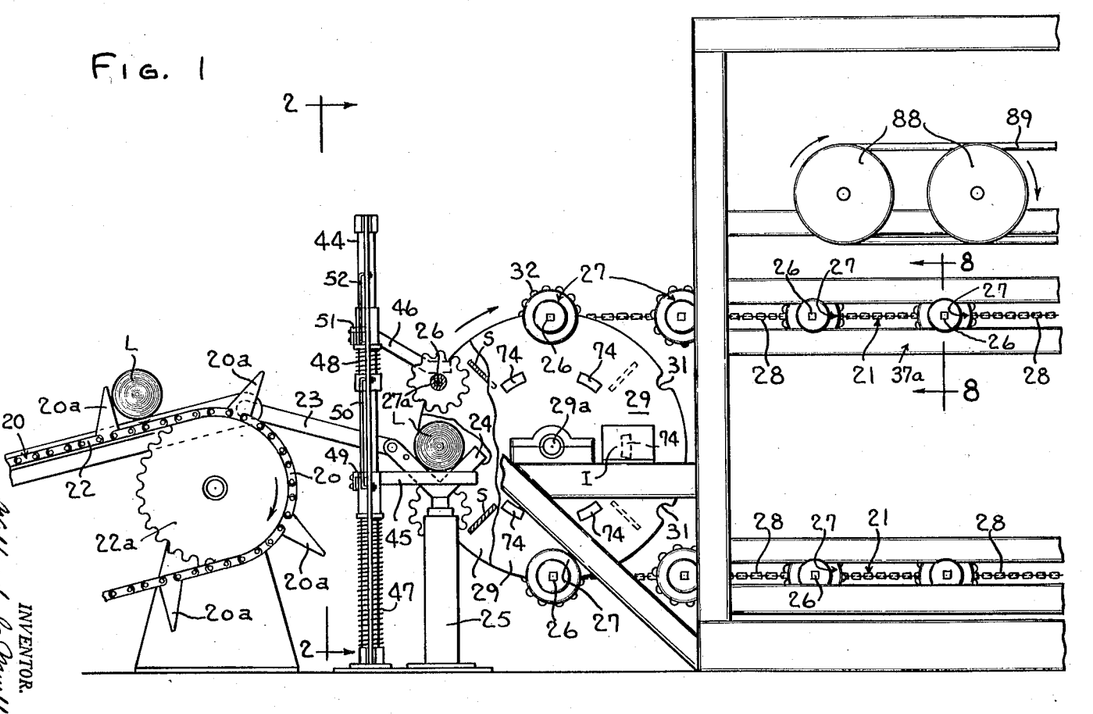
Fig. 1 is a side elevation of the entrance end of the apparatus, parts being broken away.
Figure 2:
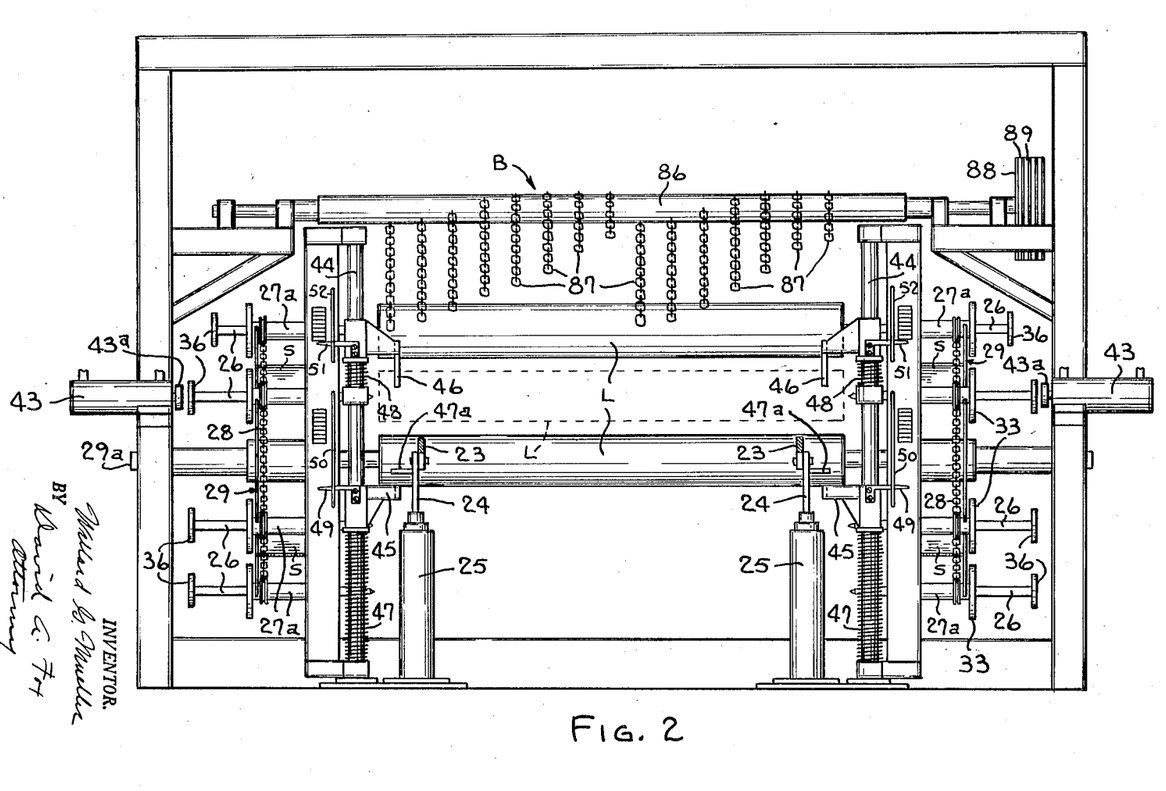
Fig. 2 is a vertical transverse section of the apparatus looking along the line 2—2 of Fig. 1.
Figure 3:
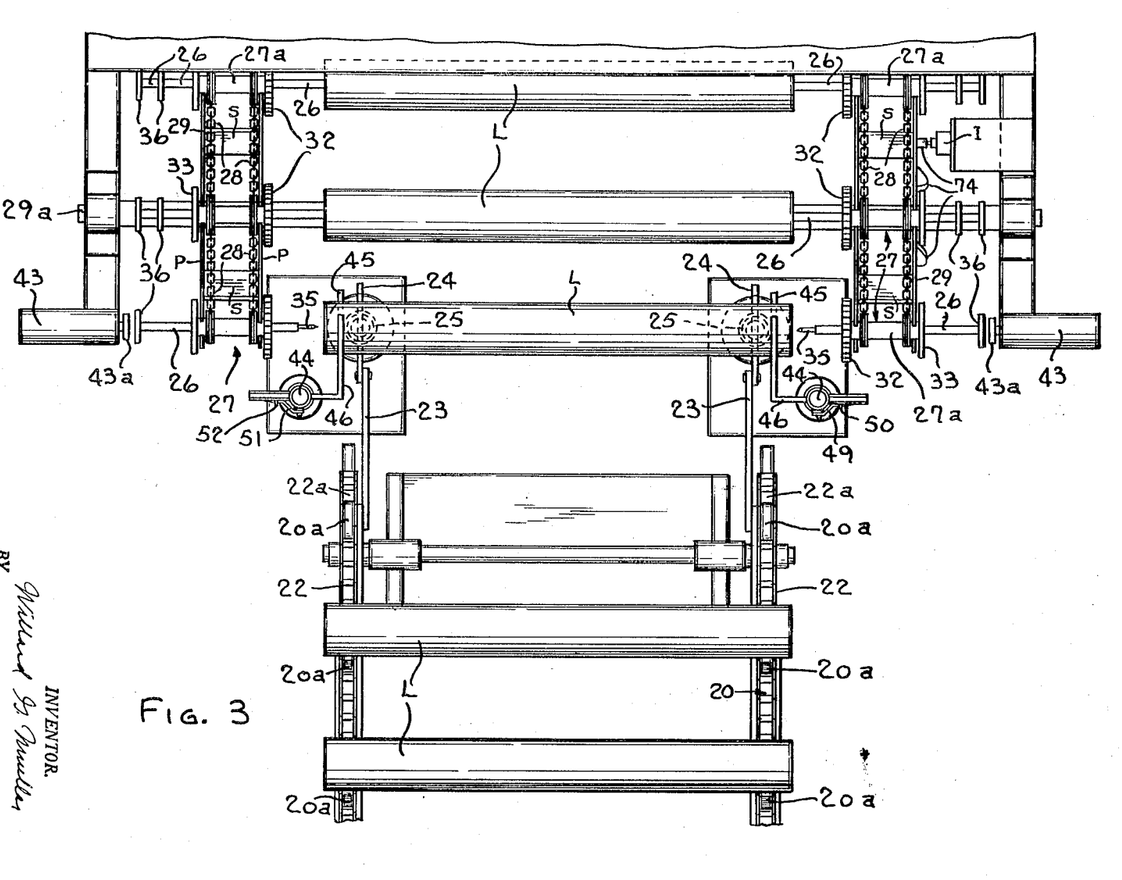
Fig. 3 is a plan view of the entrance end of the apparatus.

The conveyor 20 which may be of any suitable construction and which may be driven by a motor 72 (not shown except schematically in Fig. 18) is here shown in Figs. 1 and 3 as formed of a pair of spaced endless chains 22 running over sprockets, such as 22a, and provided with spaced log-engaging abutments 20a by which logs straddling the conveyor chains are carried to guide rails 23 over which they may roll down, one at a time, into forked portions 24 of spaced hydraulic jacks 25 by which each log is raised to a position where its ends are centered relative to spiked end spindles 26 that are mounted on revoluble carriers 27 that are linked together by sets of chains 28 to form the spaced endless portions of the main conveyor 21.

Figure 8:
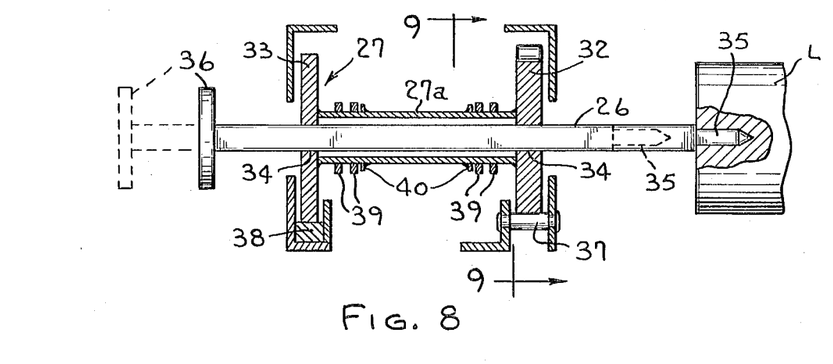
Fig. 8 is a detailed, enlarged-scale, vertical sectional view taken on the line 8—8 of Fig. 1.
Figure 9:
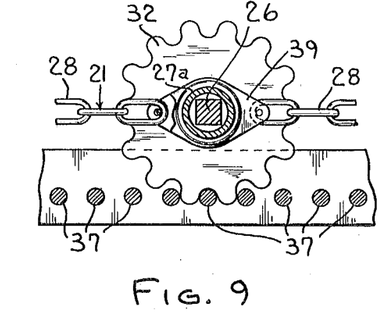
Fig. 9 is a detailed, enlarged-scale, vertical sectional view taken on the broken line 9—9 of Fig. 8.

Each of the endless portions of the conveyor 21 is trained over spaced wheels 29 at the entrance end of the machine and similar wheels 30 at the exit end of the apparatus. The spaced sets of wheels 29 or 30 are mounted on a shaft 29a or 30a suitably journalled in frame parts of the apparatus and are each provided with a series of radially disposed notches 31 which are adapted to engage cylindrical hub portions 27a of each carrier. Each of the wheels 29 or 30 include spaced wheel plates P connected together by spacer members S. As shown in Figs. 8 and 9, each carrier has a gear or sprocket 32 secured to one end and a roller or plain-faced wheel 33 secured to the other end thereof. The sprocket 32 and wheel 33 have alined square holes 34 in which the square shank of spindle 26 having a spiked end 35 is free to slide, said spindle also having a head 36. The sprocket 32 of each carrier is adapted to engage spaced pins 37 of a pin rack 37a extending lengthwise of the machine and the wheel 33 runs on a track 38 extending lengthwise of the machine in laterally spaced relation to the pin rack. The hub 27a has spaced pairs of chain connectors 39 pivotally mounted thereon adjacent collars 40 secured to said hub. An electric drive motor 41 is connected by a chain-and-sprocket drive 42 with the shaft 30a for the wheels 30. Turning of the wheels 30 acts to drive the conveyor 21, the wheels 29 with their shaft acting as idlers. As the upper flight of the conveyor is carried along, the sprockets 32 engaging the pin rack are revolved so that the spindles 26 are revolved to turn the logs L that are pinned to these spindles.

For attaching the logs to be treated to one of the carriers, air hammers 43 having headed pistons 43a are provided for driving the oppositely disposed spiked ends 35 of the spindle 26 into the ends of a log while it is in a centered position relative to a carrier.

Figure 12:
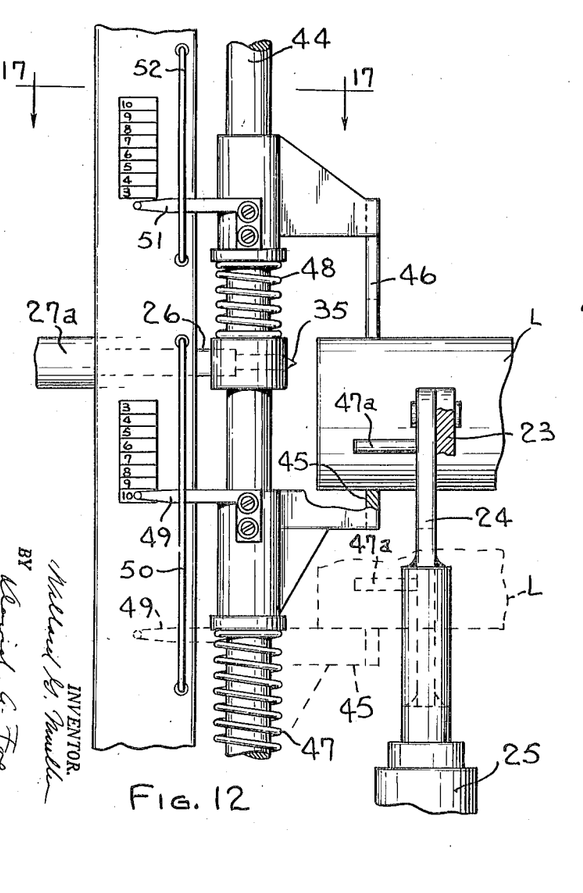
Fig. 12 is a detailed, enlarged-scale, end elevation of the log-centering mechanism, parts being broken away and parts being shown in section, with one end of the log about to be raised to a center position.
Figure 13:
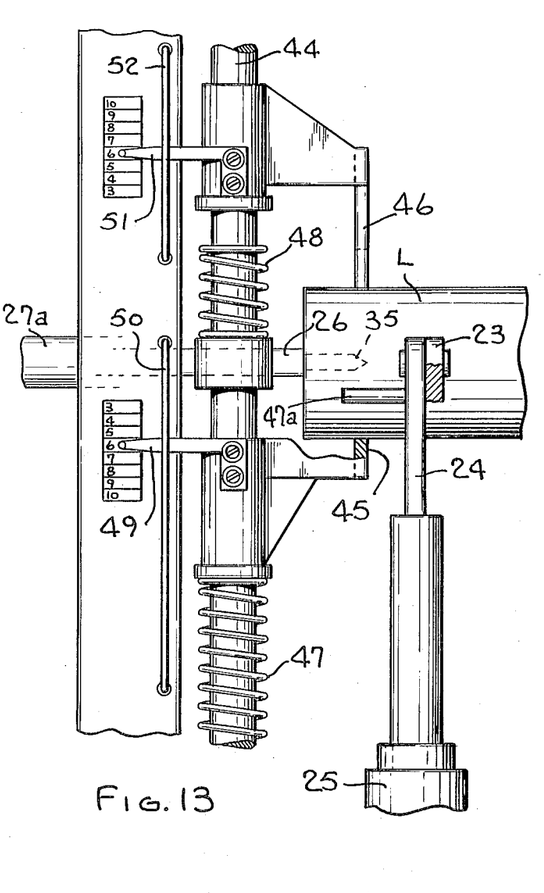
Fig. 13 is a view similar to Fig. 12 showing the end of the log in centered position.
Figure 14:
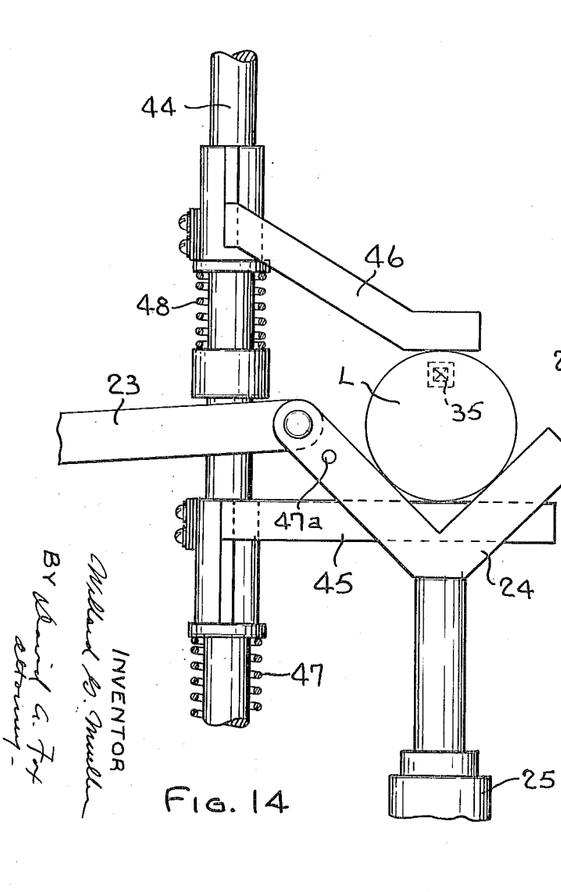
Fig. 14 is a side elevation of parts shown in Fig. 12.
Figures 15, 16:
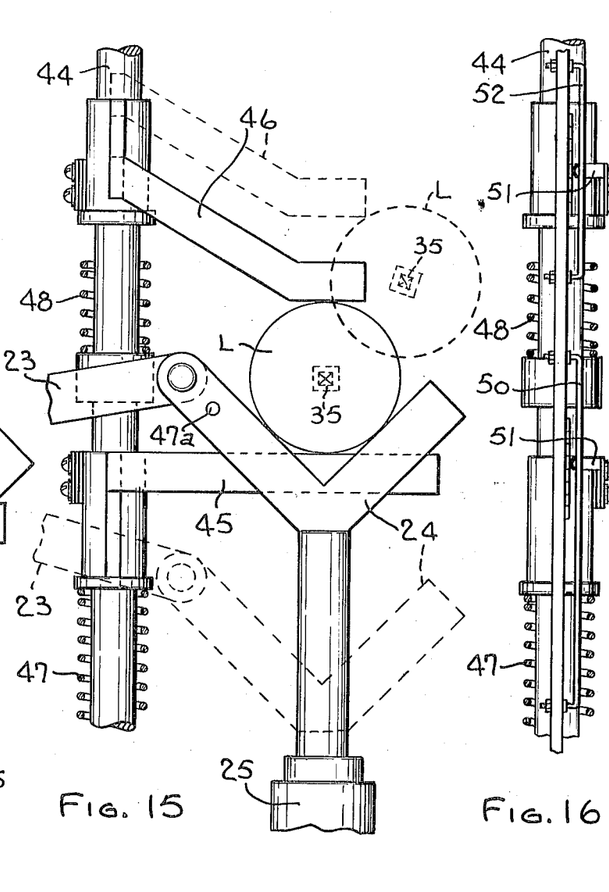
Fig. 15 is a side elevation in full of parts shown in Fig. 13.
Fig. 16 is a detailed end elevation of parts shown in Fig. 13.
Figure 17:
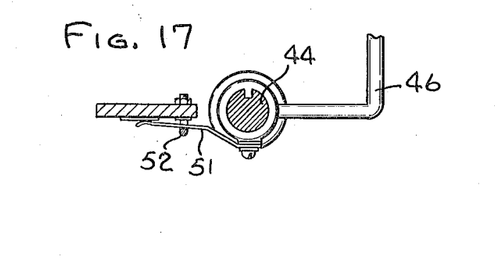
Fig. 17 (see sheet No. 6) is a detailed horizontal sectional view taken on the line 17—17 of Fig. 12.

For centering each end of a log relative to a carrier I have shown in Figs. 1 to 3 and 18 spaced standards 44 upon each of which spaced fingers 45 and 46 are vertically slidably keyed as shown in Fig. 17. Each finger 45 is moved to a log-contacting position by a spring 47, the maximum upward movement of which is limited by a stop pin 47a. Each finger 46 is supported in a lowered position on a spring 48 acting against gravity. When a log is introduced between the forks of the jacks 25, its ends depress the fingers 45 adjacent these jacks as they come to rest in the forks as shown in Fig. 1. As the jacks 25 are raised, the upper sides of the ends of the log come into contact with the associated fingers 46 as shown in Figs. 12 and 14 and the jacks then continue to raise the log carrying the upper fingers 46 upwardly as shown in Figs. 13 and 14 with the lower fingers 45 following the lower side of the ends of the log until each end of the log is centered relative to the spindle 26 at that end, and then upward movement of the jacks is arrested, the spindles 26 of that carrier 27 then in position are driven into the ends of the log by the air hammers 43, and the log thus anchored to the conveyor is carried upwardly from the position shown in Fig. 15. This upward movement as indicated in dotted lines in Fig. 15 causes the log to raise up and pass by the upper fingers 46 as the conveyor carries it into the barking section of the apparatus.

Referring to Figs. 12 to 16 and 18, each finger 45 carries a flexible-spring switch-contact member 49 that is in constant contact with a rod 50 and in its upward movement moves over one or more of a series of contacts 10 to 3 representing log diameters. Each finger 46 carries a flexible-spring switch-contact member 51 that is in contact with a rod 52 and in its upward movement moves over one or more of a series of contacts 3 to 10 representing log diameters. Corresponding contacts of the series of contacts are each connected together by a conductor 53 so that a control circuit through the switch members 49 and 51 cannot be established until the fingers 45 and 47 are in line with similarly designated contacts.

Each hydraulic jack 25 is of the double-acting type having a pressure-fluid-supply pipe 54 feeding a valve cylinder 55 having exhaust or return-pipe connections 56 and pipe connections 57 leading to opposite ends of the jack cylinder, these pipe connections being controlled by a piston valve 58 working in the valve cylinder 55 and normally held in a neutral position by springs 59. A solenoid SA acts to move the valve 58 upwardly to lower the jack, and a solenoid SB acts to move the valve 58 downwardly to cause the piston in the cylinder 25 to raise the jack.

One of the terminals of solenoids SA and SB for each jack is connected by a common conductor 60 to a current-supply line 61. The other terminal of one solenoid SA is connected to a conductor 62 and that of the other solenoid SA to a conductor 62a, the conductors 62 and 62a being connected with the other supply line 63. The conductor 62 includes switches A and H. The conductor 62a includes switches C and E. The other terminal of the solenoid SB is connected by a conductor 64 to the conductor 62 through a switch B and that of the other solenoid SB by a conductor 64a to the conductor 62a through a switch D. Thus the conductor 64 includes the switch B, and the conductor 64a includes the switch D. The switches A and C are similar, and the switches B and D are similar but have been separately designated since these switches may open at different times.

In each instance the movable contacts for the switches A and B and that for the switches C and D are mounted on an actuator rod 65 which is moved in one direction by the operator and in the opposite direction by a spring 66. A holding coil 67 is associated with each rod and forms a part of a conductor connecting conductors 64 or 64a with the associated conductor 60. Switches F and G, the coil of a solenoid SE, and a switch I are in a conductor 68 connecting a branch supply conductor 61a with the conductor 62a. In each instance the movable contacts for the switches G and H and that for the switches E and F are mounted on an actuator rod 69 which is moved in one direction by a solenoid SC or SD and in the opposite direction by a spring 70. The supply conductor 61a includes the coil of solenoid SC and is connected to the rod 50 for supplying the contact member 49 for the centering means for one end of the log. Another branch supply conductor 60a includes the solenoid coil SD and is connected to the rod 50 for supplying the contact member 49 for the centering means for the other end of the log. The rod 52 for the right-hand centering means of Fig. 18 is connected by a conductor 71 to the supply conductor 63 and the rod 52 for the left-hand centering means is connected by a conductor 71a to said conductor 63.

Figure 18:
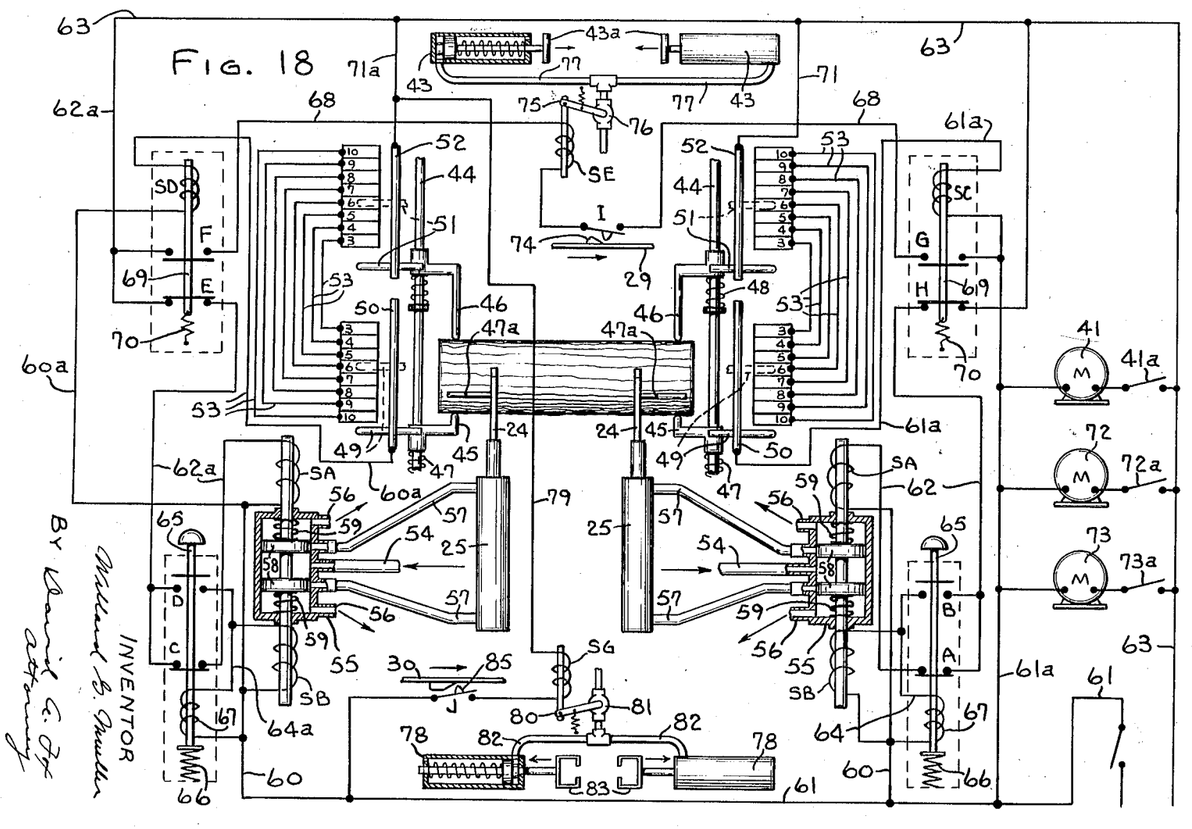
Fig. 18 is a diagrammatic view of various parts of the mechanism and the electrical controls therefor.

The motor 41 for the main conveyor 21, and its control switch 41a; the motor 72 for driving the feed-in conveyor 20, and its control switch 72a; and a motor 73 for driving the beaters hereinafter described, and its control switch 73a, are connected across the supply lines 61a and 63 as shown in Fig. 18. With the above-described circuit arrangements and switches therein the operator may close the switches 41a and 73a to put the motors 41 and 73 in operation and then on closing the switch 72a the motor 72 acts to operate the conveyor 20 to feed a log into the forks 24 of the jacks as previously described, and under these conditions since current then flows from the conductor 61 to the conductors 60, 62 and 62a including the solenoids SA, the switches A and C, and the switches H and E to the line 63, the solenoids SA of the jacks 25 are energized so that the jacks are in or moved to a lowered position. Thereafter, the operator presses on the buttons of the actuators 65 controlling the switches A and B and C and D so as to open the switches A and C and close the switches B and D. Closure of the switches B and D energizes the solenoids SB through the connection of the conductor 64 or 64a with the conductor 62 or 62a and at the same time energizes the holding coil 67 connected with the conductor 64 or 64a so as to hold the actuator 65 down in switch-closing position. As soon as the switches B and D close and the coils of solenoids SB are energized, the valves 58 for the jacks are shifted so that the lower pipes 57 are connected to the pressure source of supply and the pistons carrying the yokes 24 of the jacks are raised, thus raising the opposite ends of the log with them. As the log is raised, the fingers 45 and 46 move as previously described to carry the switch arms 49 and 51 of these fingers over the spaced sets of diameter-designating contacts previously described, and when these fingers 45 and 46 reach a position where due to the diameter or size of the right-hand end of the log the switch contacts 49 and 51 may engage a pair of connected or bridged contacts, for example, the contacts 6 shown in Fig. 18, then current from the branch supply line 61a can pass through the solenoid SC, feeder 50, and contact 49 through the bridged pair of fixed contacts 6 to the contact 51, rod 52, and conductor 71 of the other side of the line 63 for the right-hand end of the log, and similarly current can flow from the line 61 through the line 60a and the solenoid SD to the rod 50, the contact 49, the associated contacts such as 6, the contact 51, the rod 52, and the conductor 71a for the centering means at the other end of the log to the conductor 63 so that the solenoids SC and SD are energized. These solenoids may not be energized simultaneously because the ends of the logs may be of different diameters, but whatever their diameters, the spacing of each pair of the fingers 45 and 46 will remain equal to the outer diameter of the engaged end of the log as each pair of these fingers rides upwardly with the associated end of the log, so that when the correspondingly spaced pair of the switch members 49 and 51 of either centering means coincides with and thus simultaneously contacts that bridged pair of correspondingly numbered fixed contacts, the solenoid in the associated circuit will be energized. Energization of the solenoid SC causes upward movement of the actuator 69, thereby opening the switch H and closing the switch G and also opening the switch E and closing the switch F. The opening of the switch H deenergizes the solenoid SB associated therewith through the then-closed switch B so that the valve for the jack 25 at this end of the log is moved to a neutral position, stopping further upward movement, and similarly the opening of the switch E by the solenoid SD opens the circuit through the then-closed switch D that connects with the solenoid SB for the other end of the log to operate its associated valve to bring it to a neutral position so that the jack 25 at the other end of the log is arrested in its movement. Under these conditions the log in a raised condition has both of its ends centered, and while in this condition the operation of the switch I is so timed by the movement of one of a series of spaced cam projections 74 mounted on one of the wheels 29 that the switch I is closed, and as a consequence current from the branch supply line 61a passes through the conductor 68 including the switch G, the switch I, the solenoid SE, the now closed switch F, the conductor 62a to the supply line 63, thus energizing the solenoid SE. This solenoid acts through a lever 75 to open a spring-closed air valve 76 supplying air pressure to oppositely disposed pipes 77 which connect with the cylinders of the air hammers 43 so as to drive the headed pistons 43a thereof inwardly into contact with the heads 36 of the spindles 26, thereby driving the spiked ends 35 of these spindles into the centered ends of the raised log as the conveyor 21 is moving these spindles and thus moving this log out of the forked ends 24 of the raised jacks, so that as the log is carried upwardly and out of contact with the fingers 45 and 46, the fingers 46 at each end of the logs are free to drop down and the fingers 45 are free to move up whereby the positions of the contacts 49 and 51 of each of the centering means are changed relative to the diameter-designating contacts, thus breaking the circuit through the solenoids SC and SD so that the springs 70 may bring the switches G and H and F and E to their initial positions. The previously mentioned opening of the switches H and E acted to deenergize the holding coils 67 so that the actuators 65 for the switches A and B and for C and D were each moved upwardly by associated spring 66 to initial position so as to open the switch B and close the switch A and so as to open the switch D and close the switch C. With the switches A and C closed the solenoids SA are energized, shifting the valves 58 so as to cause the jacks 25 to be lowered to return the yokes 24 to their initial positions. The cycle is then ready to be repeated on the next log.

Figures 4, 6, 7:
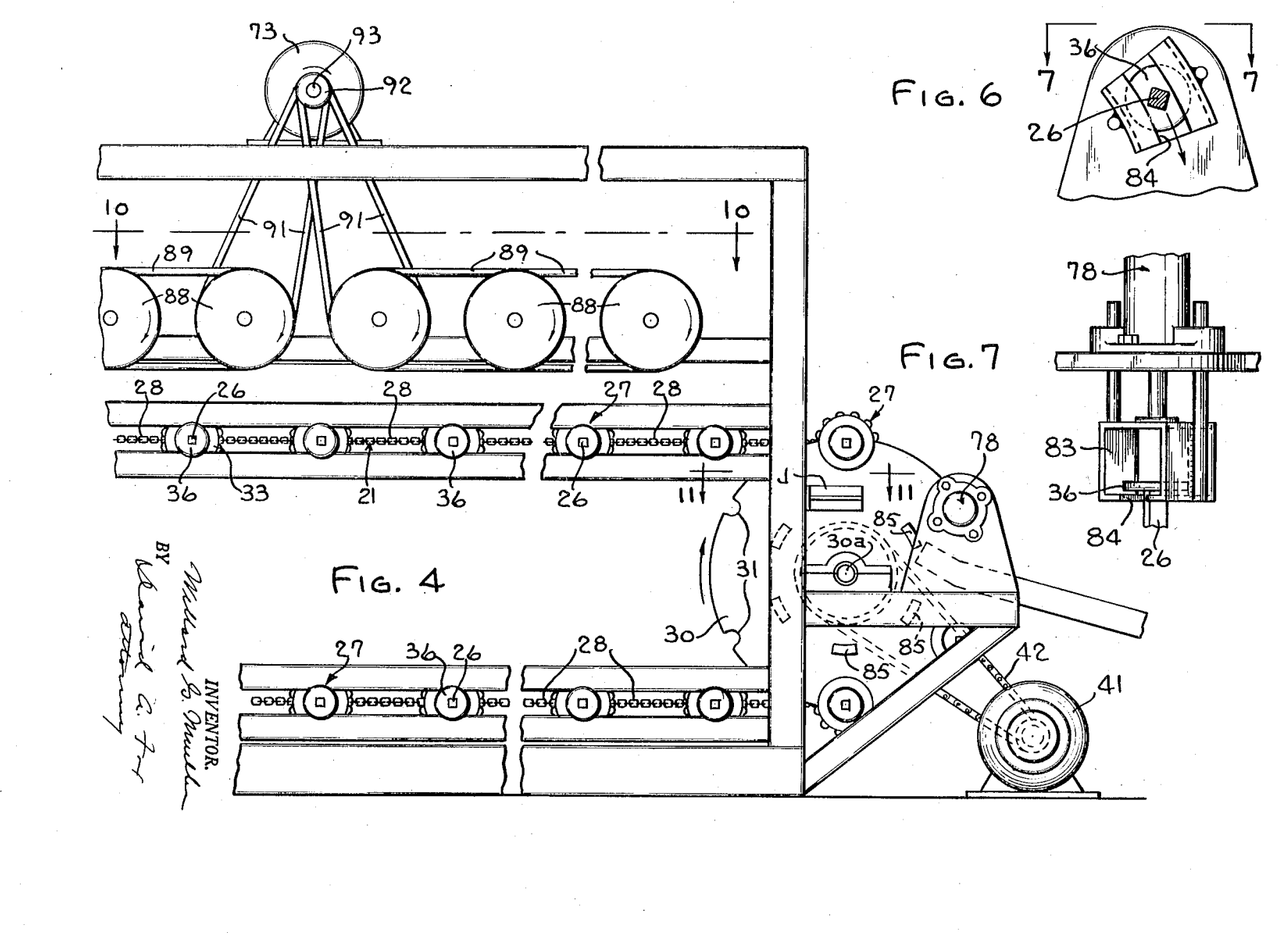
Fig. 4 is a side elevation of the delivery end of the apparatus, parts being broken away.
Fig. 6 is a detailed, enlarged-scale, vertical sectional view taken on the line 6—6 of Fig. 5.
Fig. 7 is a detailed plan view looking along the line 7—7 of Fig. 6.
Figure 5:
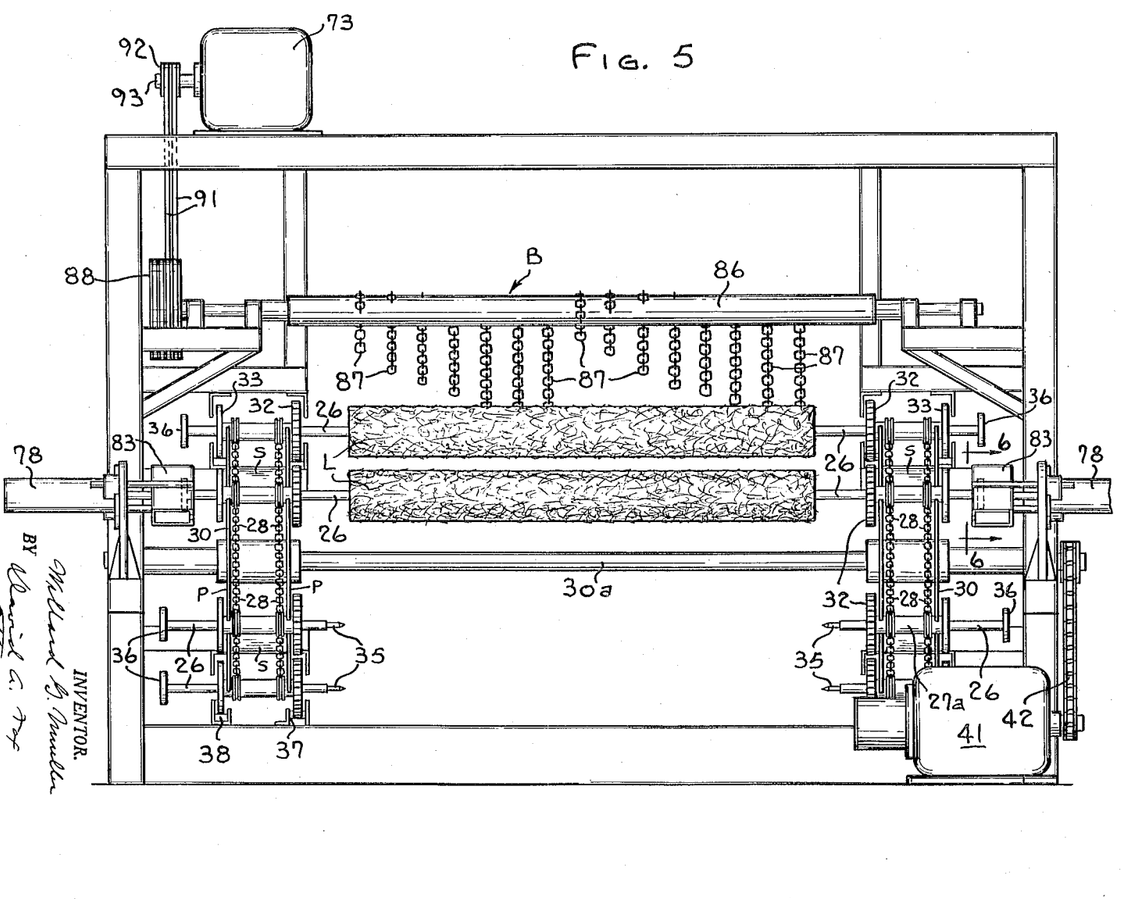
Fig. 5 is an end elevation of the delivery end of the apparatus.

The cams 74 as shown in Fig. 1 are mounted in radially spaced positions on one of the wheels 29 so that the switch I will be operated for a brief interval while the switches G and F are closed. For removing or withdrawing the spiked ends of the spindles from the ends of a log, air operated pullers 78 are mounted at the delivery end of the machine and controlled by a solenoid SG whose coil is in a conductor 79 connected across the supply lines and including a switch J. The solenoid SG acts through a lever 80 to open a spring-closed air valve 81 supplying air pressure to oppositely disposed pipes 82 which connect with the cylinders of the pullers 78 so that their forked heads 83 then in engagement with the heads 36 of the spindles 26 will pull back on these spindles to withdraw their ends from a log. As shown in Figs. 6 and 7, the end of the puller head 83 is provided with an arcuate slot 84 which permits the head 36 of the spindle to enter between the forks of the head 83 as the conveyor brings the log around on the wheels 30 to a delivery position where it may be discharged onto any suitable delivery mechanism. The switch J is operated in cyclic timing with the conveyor by a series of radially disposed cams 85 on one of the wheels 30 each time a set of alined carriers 27 reach a position where they aline with the pullers 78.

Figure 10:
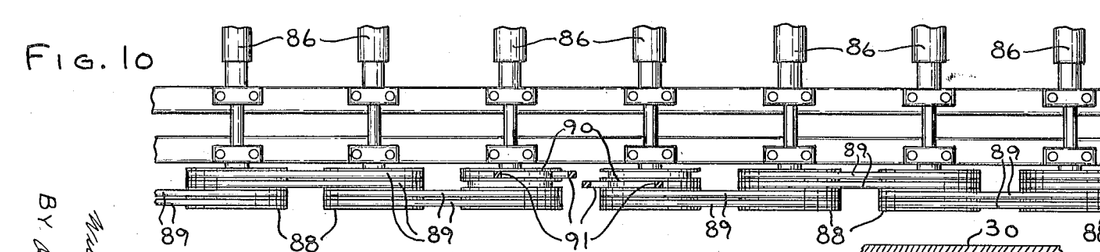
Fig. 10 is a detailed, enlarged-scale, horizontal sectional view taken on the line 10—10 of Fig. 4.
Figure 11:
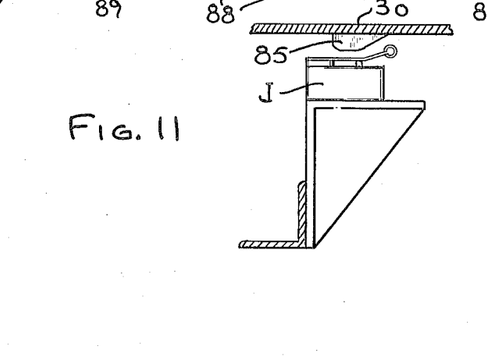
Fig. 11 is a detailed, enlarged-scale, horizontal sectional view taken on the line 11—11 of Fig. 4.

As the conveyor moves through that space spanning the wheels 29 and 30, with the logs centered and spiked to sets of the carriers 27 which are revolved as the carriers ride over the rack teeth 37, the logs are subjected to the action of a plurality of beaters B. Each beater includes a revoluble shaft 86 extending transversely of the frame and parallel to the logs and carrying a plurality of beater elements 87 here shown as chains which are spaced from each other lengthwise of the shaft and anchored to the shaft at different points circumferentially thereof so that they exert a whipping or beating action on the log at different times as the shaft 86 turns. As shown in Fig. 10, the shafts are drivenly-drivingly interconnected in overlapping pairs by double pulleys 88 and belts 89 except two of the shafts which each have a double pulley 90 that is drivingly connected by a belt 91 to a driving double pulley 92 on a drive shaft 93 of the motor 73, each pulley 90 also being drivingly connected to that pulley 88 adjacent thereto.

With the above arrangement the revolving logs are repeatedly struck over substantially their entire surface by the series of revolving beaters as they are carried past these beaters so that by the time they reach the delivery end of the machine the bark has been removed therefrom. The logs travel in a definite path which may be spaced from the beater shafts 86 so as to get the most efficient action within the range of the log diameters handled by the machine.

From the above it will be noted that the logs are delivered by the conveyor 22 one by one or one at a time to the forks 24 of the lifting jacks, are raised by these jacks to a position where they may be pinned to the carriers 27 of the conveyor 21, are centered at each end relative to a set of the carriers 27 as this set of carriers comes to a position where the air hammers 43 act to drive the spindles 26 into the ends of the logs. The logs thus connected to the conveyor 21 are carried along through the debarking section of the apparatus and since the carriers 27 their spindles 26 and the logs are rotated as they pass through this section, these revolving logs will be repeatedly subjected to broadside attack by the beater elements 87 on the shafts 86 so that by the time each log reaches the end of the upper run of the conveyor 21, and the carriers 27 engage the notches 31 in the wheels 30, each log will have been relieved of its bark, and as these carriers pass around the wheels 30, the pullers 78 will act to withdraw the spiked spindles 26 from the ends of each of the logs, after which the logs may be carried off by any suitable delivery mechanism.

While the centering and positioning means herein shown has been described with particular reference to a log-barking apparatus, it will be apparent that it could be used to position the axis of other longitudinal objects so that its axis will be brought to the right position so that some of the claims herein have not been limited to its use on logs.

What I claim as my invention is:

1. In a log-barking apparatus, the combination of an endless conveyor having spaced conveyor portions, each of said conveyor portions having alined sets of spaced revoluble independent carriers, means for connecting opposite ends only of a log to alined carriers of the conveyor, means for rotating said carriers as the conveyor moves such logs on said carriers through its upper run, and a plurality of spaced sets of rotary beaters disposed transversely of said conveyor and mounted above the upper run thereof, each set of beaters having a plurality of flexible beater elements spaced lengthwise of such logs on said carriers for removing bark therefrom, and means for driving said conveyor.

2. In a log-barking apparatus, the combination of a pair of spaced lifting jacks for receiving opposite ends of a log, power-operated means for raising each of said jacks until that end of a log carried by each jack is centered, a movable carrier means including spaced carrier members having spike-end spindles, and cyclically timed fluid-pressure-operated hammer means for driving the spike ends of said spindles into opposite ends of a raised log when such opposite ends are in a centered position with respect to said spindles.

3. In a log-barking apparatus, the combination of an endless conveyor having spaced conveyor portions, each of said conveyor portions having alined sets of spaced revoluble carriers, a spike-end spindle mounted in each carrier, means for positioning a log with its longitudinal axis in substantial alinement with the spindles of a set of carriers of the conveyor, cyclically timed fluid-pressure-operated hammer means for driving the spike ends of said alined spindles into opposite ends of a log thus positioned, means for positively rotating said carriers as the conveyor moves such logs attached thereto through one of its runs, a plurality of spaced sets of rotary beaters, each set of beaters having beater elements spaced lengthwise of such logs on said carriers for removing bark therefrom, means for driving said conveyor, and cyclically timed fluid-pressure-operated puller means at the delivery end of the conveyor for withdrawing the spike-end spindles from each log.

4. In a device for raising and positioning an object having a longitudinal axis, a pair of spaced fluid-pressure-operated jacks for receiving opposite ends of such object, valve means for controlling the operation of said jacks, a pair of fingers for engaging opposite sides of each end of such object as it is raised, and an electrical control for said valve means rendered operative to stop the upward travel of said jacks by reason of said fingers being positioned at equal distances from the longitudinal axis of such object when each end of such object reaches a predetermined elevated position whereby said jacks will hold such object with each end in such predetermined elevated position.

5. In a device for raising and positioning an object having a longitudinal axis, a pair of spaced power-operated jacks for receiving opposite ends of such object, control means for raising and lowering said jacks, a pair of fingers for engaging opposite sides of each end of such object as it is raised, an electrical control for said control means including a control circuit that, when closed, will stop the upward travel of said jacks, switch means in said circuit, said switch means being carried by each finger and being operable to close said circuit by reason of said fingers being positioned at equal distances from the longitudinal axis of such object when each end of such object reaches a predetermined elevated position whereby said jacks will hold such object with each end in such predetermined elevated position.

6. In a device for raising and positioning an object having a longitudinal axis, a pair of spacer lifting jacks for receiving opposite ends of such object, means for controlling the lifting action of said jacks to bring the longitudinal axis of such object to a predetermined elevated position comprising a pair of fingers for engaging opposite sides of each end of such object as it is raised, each of said fingers carrying a switch contact, a control circuit including a set of fixed contacts for each pair of fingers, the fixed contacts of each set being progressively spaced at different distances from a central plane between each outermost contact of each set of contacts, the correspondingly spaced contacts of each set being connected or bridged whereby when the pair of fingers at each end of such object have their switch contacts in contact with any pair of correspondingly spaced contacts the control circuit is established, and means controlled by said control circuit for stopping the lifting action of said jacks.

References Cited in the file of this patent

UNITED STATES PATENTS

| 1,106,177 | Andersen | Aug. 4, 1914 |
| 1,646,115 | Sjostrom | Oct. 18, 1927 |
| 2,441,925 | Wege | May 18, 1948 |
| 2,599,962 | Williford | June 10, 1952 |
| 2,695,595 | Hagerman | Nov. 30, 1954 |

FOREIGN PATENTS

| 27,924 | Sweden | Dec. 23, 1909 |

UNITED STATES PATENT OFFICE
CERTIFICATE OF CORRECTION

Patent No. 2,839,106                         June 17, 1958

Willard G. Mueller

It is hereby certified that error appears in the printed specification of the above numbered patent requiring correction and that the said Letters Patent should read as corrected below.

Column 4, line 13, for "to sad" read --to said--; line 57, for "of the other" read --to the other--; column 6, line 48, for "back" read --bark--; column 8, line 14, for "spacer" read --spaced--.

Signed and sealed this 7th day of October 1958.

(SEAL)
Attest:

KARL H. AXLINE
Attesting Officer

ROBERT C. WATSON
Commissioner of Patents